INVENTOR
JACOB F. M. ESSIG
BY
Barnwell R. King
ATTORNEY

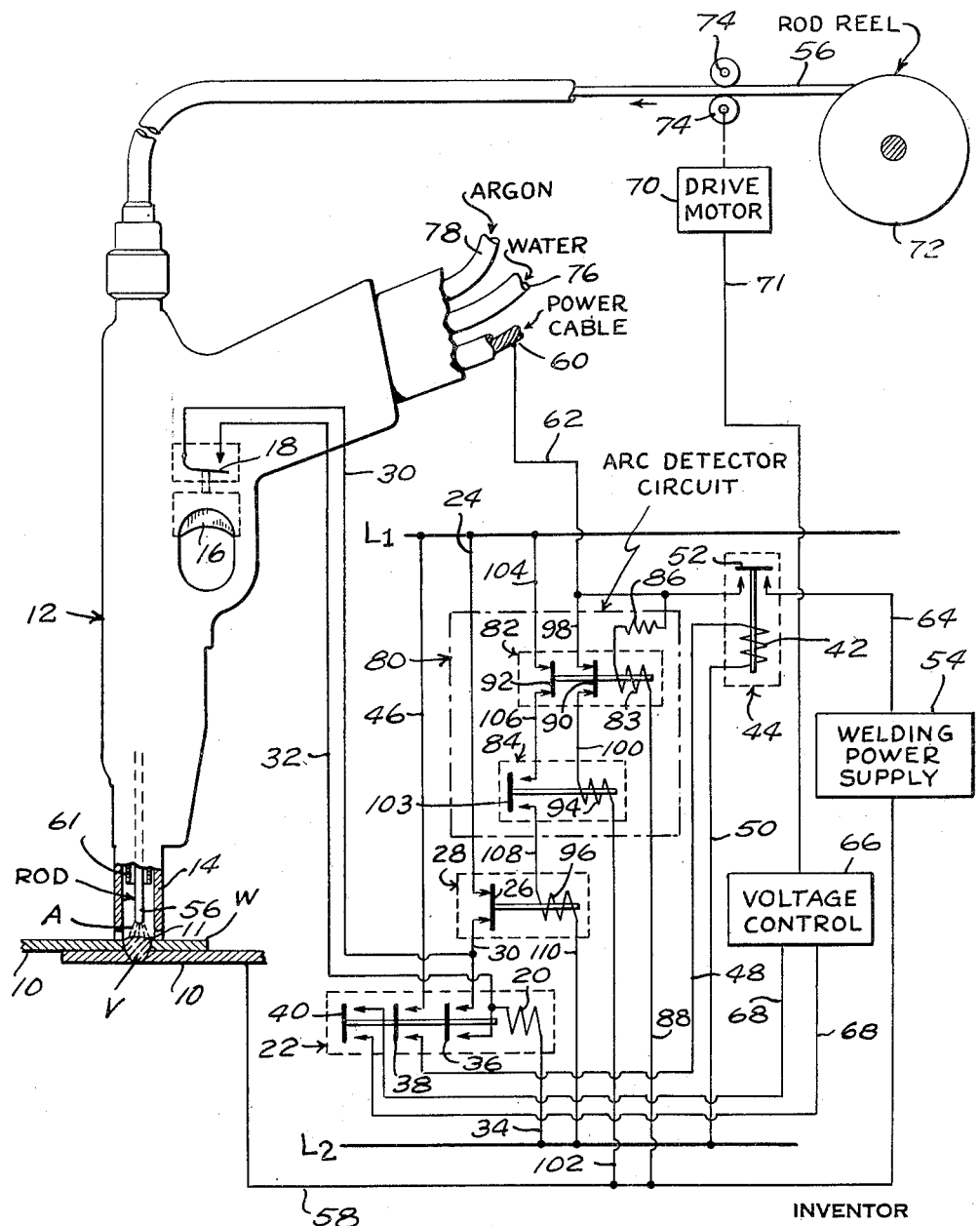

United States Patent Office 2,776,361
Patented Jan. 1, 1957

2,776,361

SIGMA SPOT OR TACK WELDING

Jacob F. M. Essig, Avenel, N. J., assignor to Union Carbide and Carbon Corporation, a corporation of New York Application April 15, 1953, Serial No. 348,958

9 Claims. (Cl. 219—74)

This invention relates to spot or tack welding, and more particularly to such welding by the sigma (shielded-inert-gas-metal-arc) process. Examples of sigma welding are disclosed in Muller et al. 2,504,868, and Kennedy 2,532,410.

It has been proposed by Pilia 2,583,665 to fabricate metal parts from one side only by spot or tack welding in which a refractory metal (thoriated tungsten) electrode is used that is essentially non-consumable. Such welding requires that the interfacing surfaces of the parts be thoroughly cleaned before assembly, especially in the case of aluminum and its alloys. Also the parts must be held together tightly to establish a relatively good metal-to-metal contact for success of the process, which is not always possible on account of the geometry of the work. Even where the fabrication is successful, a dimple is formed by each of such tack or spot weld which, in some cases, is highly undesirable; and the metal of the weld is subject to undesirable cracking upon cooling. Furthermore, such spot or tack welding normally requires the use of electrodes composed of relatively expensive and scarce thoriated tungsten. Sigma welding for spot and tack welding is, in general, not satisfactory, because of the liability of fusing a hole through the work due to the very rapid rate at which the fusible metal electrode is fed toward the arc; or of poor welds which fail satisfactorily to unite the parts, especially when the interfaces are out of contact or are unclean.

Therefore, the main object of this invention is to provide a sigma spot or tack welding process which overcomes such disadvantages and difficulties, yet which retains the benefits associated with inert (argon and/or helium) gas shielded arc welding, and greatly advances the art. Another object of the invention is to provide a sigma spot welding apparatus that is consistent in the production of sound welds even when the parts are composed of aluminum and its alloys, stainless steel, carbon steel, etc. The invention is also applicable to the fabrication of parts that are composed of copper and other metals.

Such objects are accomplished, according to the invention, by applying the nozzle of a sigma welding gun or torch against one side of the work consisting of overlapping parts (sheets or plates) which are to be spot or tack welded, and striking an arc between such work and the fusible metal electrode (wire or rod) within such nozzle. At the exact instant such arc starts, the fusible metal electrode is automatically fed toward the arc at a very rapid rate (200 I. P. M. and upwards in the case of $\frac{1}{16}$" wire electrodes), while the gun is held in place with respect to the work, and the welding zone is bathed in a stream of gas selected from the class consisting essentially of argon and/or helium gas discharged from such nozzle.

If the interfaces of the overlapping parts are out of contact, or unclean, the electrode and welding arc are interrupted, according to the invention, for a relatively short critical time interval when the metal of both parts has been fused at least through the interfaces, permitting the fused metal to cool and solidify, leaving a crater which extends to the second part, and then, while the gun is still held in place, the arc and electrode feed are automatically re-established and maintained until the crater is completely filled in.

In case the parts are in close contact, the interruptions of the welding arc and rod feed in the progress of fusion between the parts may be omitted.

It is not necessary to hold the sigma welding gun stationary at all times with respect to the work i. e., such gun may be moved slowly sidewise in contact with the side of the work during the first and second sigma welding cycles, if desired, without departing from the invention.

The invention includes automatic means for critically timing each actual spot or tack welding cycle, or cycles, i. e., the durations of the arc and the fusible electrode feed from start to finish, so that correct penetration of the weld through the parts from one side only thereof, and the proper amount of metal supplied by the fusible metal electrode to the metal arc are critically correlated.

Advantages and/or new and unexpected results of the invention over the prior art are: metal parts can be tack or spot welded consistently, holes through the work are avoided, the interfaces do not have to be cleaned beforehand to remove oxides therefrom, it is not necessary to press the parts together tightly, relatively thick parts can be successfully fabricated from only one side, welds of better quality are produced, slag removal and slag inclusion are eliminated, the use of expensive and scarce thoriated tungsten electrodes is avoided, and dimpled and cracked welds are entirely eliminated by the invention:

In the drawings:

Fig. 1 is a diagram illustrating the single welding cycle form of the invention.

Figure 2A:
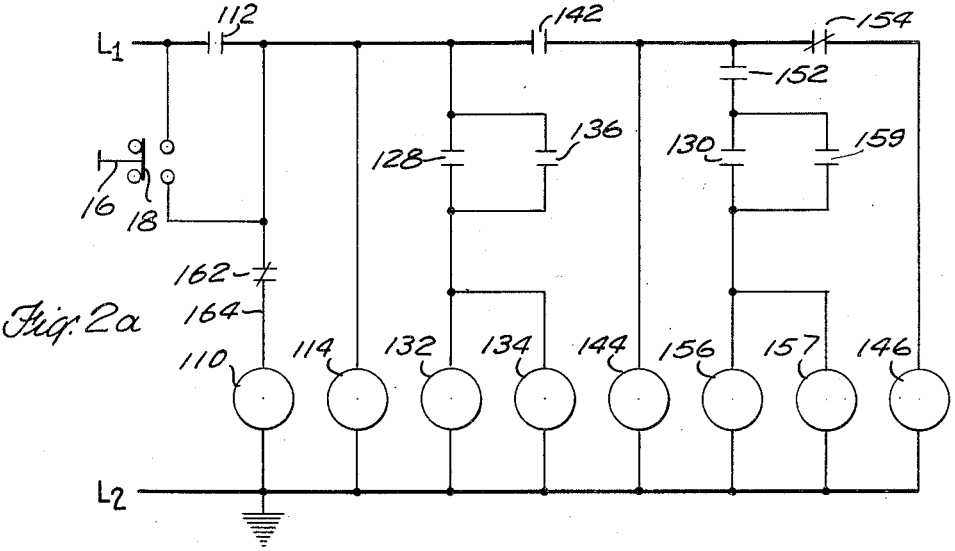
Figs. 2a and 2b are parts of a diagram illustrating the double-welding cycle form of the invention.

The parts of work W, such as plates 10, 10, to be spot or tack welded from one side only, are in overlapping relation, as shown, and a sigma welding torch or gun 12 is held with its nozzle 14 pressed against the outside of such overlapping parts. The trigger 16 of the gun 12 is then pressed, closing a switch 18 and thereby energizing a coil 20 of a starting relay 22, from a suitable electrical source of supply, not shown, line L₁, conductor 24, normally closed switch contactor 26 of a time delay relay 28, lead 30, switch 18, lead 32, winding 20, conductor 34, and line L₂. Energization of coil 20 closes normally open switch contactors 36, 38 and 40 of the starting relay 22. Closure of contactor 36 establishes a holding circuit across switch 18 and in series with coil 20, which keeps the coil 20 energized upon release of the trigger 16.

Closure of the starting relay contactor 38 results in the energization of coil 42 of a welding relay 44, through a circuit including line L₁, conductor 46, contactor 38, conductor 48, winding 42, conductor 50, and line L₂. Such energization of the welding relay coil 42 closes normally open contactor 52 of relay 44, which results in connecting a welding power supply 54 across the welding rod 56 and the work W, through a ground lead 58 on one side, and a power cable 60, electrode lead 62, switch 52, and conductor 64 on the other side of such welding power supply 54. Normally, the power cable 60 is connected to an electrode guide tube 61 in the gun 12.

Closure of the starting relay 40, operates an automatic control circuit such as a voltage control 66 through leads 68, 68. Such control circuit 66 determines the operation of an electrode drive motor 70 through an electrical cable 71. Such drive motor, when energized, feeds the welding rod 56 (or wire) from a reel 72, through feed rolls 74, which are driven by the motor 70, and through the gun 12. The control 66 automatically starts the welding action by any suitable means or method including, for example, by causing the motor 70 to feed the rod 56 toward the work, with or without the use of a high-frequency potential associated with the welding power supply 54; or by retract starting, i. e., by automatically advancing the rod until it contacts the work W, and then automatically withdrawing the rod momentarily to draw the arc, and again automatically advancing such rod; or by a so-called "flying" start.

The control 66 also operates cooling liquid and shielding gas supply valves, not shown, which control the flow of water and argon, for example, to conduits 76 and 78 therefor which lead to the gun 12. The cooling water is circulated in the gun, but the shielding gas is discharged from the nozzle 14 thereof in an annular stream which protects the arc A and heated metal adjacent thereto from the atmosphere.

The instant the welding arc A starts between the rod 56 and the work W, an arc detector circuit 80 is energized, which comprises an overvoltage relay 82 and an undervoltage relay 84. Under open circuit conditions (between rod 56 and work W) the overvoltage relay coil 83 is energized, being connected across the electrode lead 62 and the ground or work lead 58 by a circuit which includes a resistor 86 and conductors 88, opening normally closed contactors 90 and 92 thereof, and thus preventing energization of coil 94 of the undervoltage relay 84, and of coil 96 of the time delay relay 28.

However, when the welding arc A is struck, the voltage between leads 62 and 58 drops, and coil 83 of the overvoltage relay 82 releases contactors 90 and 92, which close. At the same time the coil 94 of under-voltage relay 84 is energized through a circuit, connected across electrode lead 62 and ground or work lead 58, which includes conductor 98, contactor 90, conductor 100, coil 94, and conductor 102. Energization of coil 94 of relay 84 closes contactor 103 thereof, resulting in the energization of coil 96 of the time delay relay 28, through a circuit which includes line L₁, conductor 104, switch 92, conductor 106, contactor 103, conductor 108, timer coil 96, conductor 110, and line L₂. Thus, the arc detector circuit accurately starts the timing cycle of the welding operation the instant the arc is struck and the rod feed starts.

During the welding cycle the rod 56 is fed toward the work W at a rapid rate of the order of 200 inches per minute, more or less depending upon the size of the rod and the value of the welding current. Metal is transferred as a spray from the end of the rod to the work, and the metal of the parts 10, 10, under the rod is fused across the joint therebetween in a very short time interval at the end of which the time delay relay 28 automatically opens its contactor 26, thereby breaking the holding circuit including contactor 36 of the starting relay 22, stopping the rod feed and the welding cycle exactly when the tack or spot weld V is complete, and the circuit components are restored to their original condition, ready for another welding cycle. The gun 12 is then removed from the work W.

The time delay of the relay 28 is adjustable so that the critical length of time during which the rod 56 is fed toward the arc can be preset according to the relative thickness of the work W to obtain a satisfactory sigma tack or spot weld V which successfully unites the plates 10, 10, and has a convex top surface 11. Any weld crater, which would otherwise result, is completely filled with metal supplied by the fusible metal electrode. If the welding time cycle is even slightly too long, a hole results which extends through the parts. If it is too short the parts are not welded together, or a very weak connection is formed therebetween, and a crater or cavity is formed in the first (top) part. It is essential, therefore, that the arc be detected at the instant it starts, and that the arc and rod feed each be stopped at the proper instant.

During the sigma spot or tack welding operation the arc and fused metal under the barrel of the gun are continuously shielded from the atmosphere by a stream of argon which is discharged from the gun. While argon is preferred, any other suitable shielding gas such as helium, or mixtures of argon and helium, may be used.

The following table includes typical data for various metals in carrying out the invention with a single welding cycle in each example.

*Single-welding cycle data*

| Material | Shielding Gas, Argon, C. F. H. | Welding Current, amps., D. C. R. P. | Time (sec.) | Work Thickness (in.) | Welding wire dia. and speed | | Arc Voltage (Volts) |
| --- | --- | --- | --- | --- | --- | --- | --- |
| | | | | | Inches | I. P. M. | |
| Al | 35 | 280 | 2 | ⅛ | ¹⁄₁₆ | 240 | 22 |
| Al | 35 | 240 | 1 | ¹⁄₁₆ | ¹⁄₁₆ | 200 | 22 |
| NiCr Alloy 302-304 | 30 | 260 | 1 | ¹⁄₁₆ | ¹⁄₁₆ | 200 | 22 |
| 302-304 NiCn Alloy | 30 | 300 | 1½ | ⅛ | ¹⁄₁₆ | 220 | 22-24 |
| SAE 1020 Mild Steel | 30 | 300 | 1½ | ⅛ | ¹⁄₁₆ | 220 | 22-24 |
| Copper | 40 | 325 | 1½ | 0.030-.060 | ³⁄₆₄ | 400 | 28.5 |

Figure 2B:
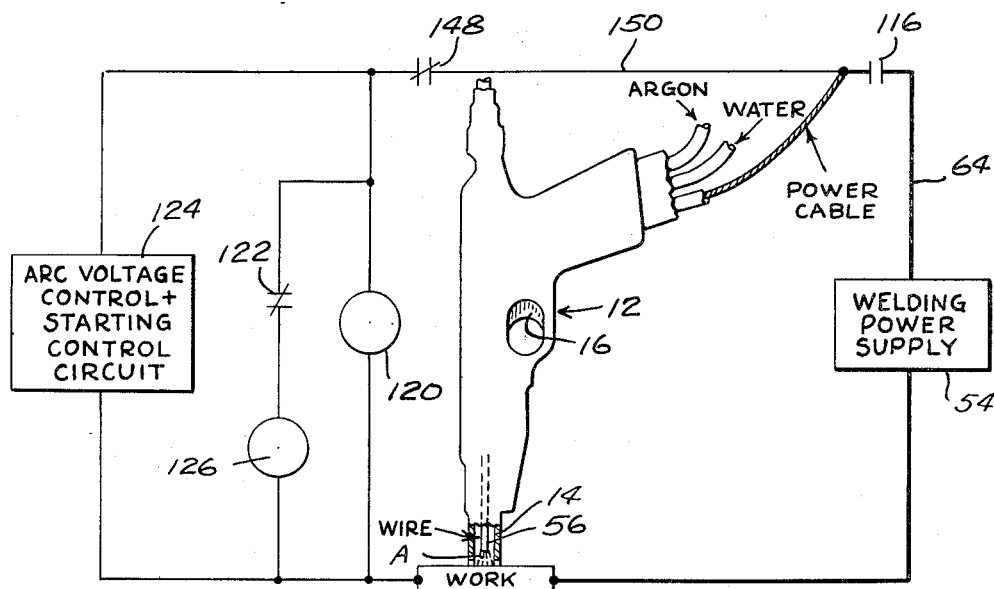
Figure 3:
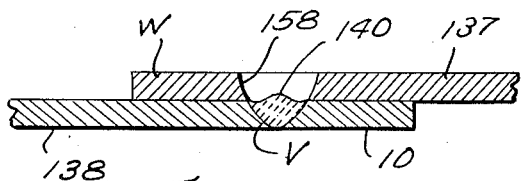

As shown in Figs. 2a and 2b, two-cycle sigma spot or tack welding is accomplished, according to the invention, by holding the sigma welding gun 12 against one side of the work W and squeezing trigger 16, closing switch 18. This causes an auxiliary welding contactor relay 110 to be energized. Closing its normally open contacts 112, and energizing a welding contactor relay 114 which closes its normally open contacts 116 connected in lead 64 from the welding power supply 54. As a result the overvoltage relay 120 is energized, opening its normally closed contacts 122. The arc voltage control and starting control circuit 124 thereupon feeds the wire 56 toward the work W and retracts the wire when it touches the work, drawing the arc A. Over voltage relay 120 becomes deenergized on normal welding voltage, closing contacts 122. The under-voltage relay 126 becomes energized, closing its normally open contacts 128 and 130. Control circuit 124 thereupon feeds the wire 56 toward the work W at a very rapid rate in response to the welding arc voltage. At the same instant, the time delay relay 132 and starting-hold relay 134 are energized, closing normally open contacts 136 of relay 134, around contacts 128. The time delay relay 132 starts for the welding period for the first welding cycle during which time, one-half of a second for example, the arc A fuses the work W through the first part 137 at least to the interfaces between the parts 137, 138, Fig. 3; and preferably to, but not through, both parts 137 and 138, as shown at 140.

At the end of the first welding cycle, the time delay relay 132 closes its normally open contacts 142, causing the no-weld time delay relay 144 and a signal relay 146 to be energized. The signal relay 146 thereupon opens its normally closed contacts 148 in lead 150 to control circuit 124 which automatically stops the wire feed and the arc. During the no-weld time interval, about one-half second for example, the stream of protective gas continues to be discharged by the gun, and the fused weld metal 140 cools and solidifies.

Figure 4:
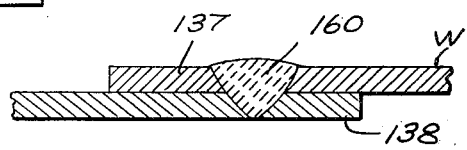
Figs. 3 and 4 are sectional views of the work illustrating such double-welding cycle at the ends of the first and second welding cycles, respectively.

At the end of the no-weld timing interval, relay 144 closes its normally open contacts 152 and opens its normally closed contacts 154. Thus, signal relay 146 is deenergized, causing its contacts 148 to close; and the second welding time delay relay 156 is energized, through the operation of relay 126, closing contacts 130, starting the second sigma welding cycle. At the same time a holding relay 157 is energized, closing its contacts 159 around contacts 130. During such second welding cycle, the wire 56 is fed toward the work at a very rapid rate after the arc is automatically started, as pointed out above in describing the first sigma welding cycle, about one-half second for example. The work metal under the arc A is fused and the crater 158 left in the work as a result of the first sigma welding cycle is completely filled with fused metal supplied by the end of the wire 56, leaving a weld nugget 160, Fig. 4, at the end of the second welding cycle which results when the time delay relay 156 opens its normally closed contacts 162 in the supply line 164 of the auxiliary welding contactor relay 110. The resulting deenergization of relay 110 opens its contacts 112, the welding action stops, and all of the timing relays are reset. The gun 12 is removed from the work W and applied to a new site.

Such double sigma welding cycle assures a sound spot or tack weld which unites the parts even when the interfaces are unclean and/or entirely out of contact prior to the welding operation. This solves a troublesome problem especially in the case of aluminum and its alloys.

I claim:

1. Sigma spot or tack welding apparatus comprising the combination with a sigma welding gun and means for supplying welding power between a fusible metal welding electrode and the work to be welded, including a work lead and an electrode lead; of means for accurately timing the welding cycle, means for starting a welding arc between the end of such electrode, means for feeding such electrode toward the work at a relatively rapid rate, and an arc detector circuit for initiating the operation of said timing means at the exact instant that such welding arc starts, comprising an overvoltage relay and an undervoltage relay, said overvoltage relay having a coil connected across said electrode and work leads, and two normally closed contactors which open when said coil is energized, said undervoltage relay having a coil connected across said leads through one of said contactors, and a normally open contactor, means for energizing said timing means including a circuit containing said normally open contactor and the other contactor of said overvoltage relay, whereby under open circuit conditions the overvoltage relay coil is energized, opening the two normally closed contactors thereof and thus preventing energization of the undervoltage relay coil and timing means, but when the welding arc is struck, the two over-voltage relay contactors close, thus energizing the under-voltage relay coil which closes its contactor, resulting in the energization of the timing means which is also provided with means for simultaneously stopping the welding arc and such rod feed precisely at the end of the timing cycle.

2. Apparatus as defined by claim 1, in which the timing means is adjustable.

3. Process of double-cycle welding work consisting of overlapping parts of metal, from one side only thereof, which comprises striking an arc between a fusible metal electrode and one of such parts from such side of the work, feeding such electrode toward such arc at a relatively rapid rate, fusing the end of the electrode and the adjacent metal of such part until the metal of the parts is fused at least through the interfaces thereof, at such point automatically stopping such arc and the electrode for a critical time interval, permitting the fused metal to cool and solidify, leaving a crater which extends to the surface of the second part, at the end of such interval, automatically starting the arc and electrode feed, fusing the end of the electrode and the adjacent metal of the craters, filling such crater with metal supplied by such electrode, then automatically stopping the arc and electrode, leaving metal uniting such overlapping parts with sound weld metal, and during all of such steps shielding the arc and adjacent electrode and work metal from the atmosphere with a stream of protective gas selected from the class consisting essentially of argon, helium, and mixtures thereof.

4. Apparatus for double-cycle welding work consisting of overlapping parts of metal having interfaces which are unclean and out of contact with each other, comprising the combination of means for striking an arc between such work and an electrode composed of such metal, means for feeding such electrode toward such arc at a relatively rapid rate, means for continuously shielding such arc and the adjacent metal with a stream of protective gas, means responsive to the striking of said arc for automatically timing the duration of the first welding cycle so that the work metal is fused at least through such interfaces and a crater is formed in the first part of the work, means for stopping the arc and electrode feed at the end of such time while the stream of protective gas continues to shield the heated metal, means for automatically timing the no-weld cycle during which the fused metal is permitted to cool and solidify, means, responsive to said no-weld timing means, for restriking the arc between the metal in such crater and the end of such electrode and again feeding the latter rapidly toward the work, fusing the adjacent metal of both parts of the work and filling such crater with fused metal supplied by the end of the electrode, and means, responsive to such restriking of the arc, for automatically timing such second welding cycle so that the welding action stops when the crater is completely filled with metal.

5. Process of sigma spot welding work composed of overlapping parts of solid metal from one side thereof, which comprises bathing the tip of a fusible metal electrode and the adjacent area on one side of such work in a suitable arc-shielding gas, initiating an arc between such electrode tip and such side of the work, mechanically feeding such electrode toward the work at a speed of at least 200 inches per minute, fusing the end of the electrode and adjacent metal of such part and advancing the electrode tip axially into the resulting fused hole in the upper part and forming a crater which extends into the lower of such parts while maintaining the arc voltage within preset upper and lower limits, depositing filler metal from the fusible electrode in the crater and hole to form a weld between the parts and critically timing the electrode feed and arc duration with relation to the time of arc initiation to stop the electrode feed and the flow of welding current before a hole is melted entirely through the lower part, whereby to leave the parts united with solid weld metal extending from the bottom of the crater in the lower part to the upper surface of the upper part.

6. Process of sigma spot welding as defined by claim 5, in which the arc-shielding gas is selected from the class consisting essentially of argon, helium, and mixtures thereof.

7. Process of sigma spot welding as defined by claim 5, in which the metal electrode and metal parts are selected from the class consisting of aluminum and alloys thereof, copper, carbon steels, nickel-chromium alloys, and stainless steels.

8. Process of sigma spot welding as defined by claim 5, in which the electrode is mechanically advanced without interruption.

9. Process of sigma spot welding as defined by claim 5, in which the electrode feed and the arc are interrupted for a short critical time interval during the process.

References Cited in the file of this patent

UNITED STATES PATENTS

| | | |
|---|---|---|
| 1,293,871 | Murray | Feb. 11, 1919 |
| 1,831,343 | Caldwell | Nov. 10, 1931 |
| 2,469,790 | Schmerber | May 10, 1949 |
| 2,510,205 | Baird | June 6, 1950 |
| 2,583,665 | Pilia | Jan. 29, 1952 |